(12) United States Patent
Chen et al.

(10) Patent No.: US 8,492,018 B2
(45) Date of Patent: Jul. 23, 2013

(54) CHARGEABLE BATTERY MODULE OF ELECTRIC CAR

(75) Inventors: Shih-Hui Chen, Taoyuan Hsieh (TW); Chin-Tien Lin, Taoyuan Hsieh (TW); Tung-Han Kao, Taoyuan Hsieh (TW)

(73) Assignee: Tennrich International Corp., Taoyuan Hsieh (TW)

( * ) Notice: Subject to any disclaimer, the term of this patent is extended or adjusted under 35 U.S.C. 154(b) by 328 days.

(21) Appl. No.: 12/940,502

(22) Filed: Nov. 5, 2010

(65) Prior Publication Data

US 2012/0114997 A1 May 10, 2012

(51) Int. Cl.
 *H01M 2/10* (2006.01)
(52) U.S. Cl.
 USPC .......................................................... 429/99
(58) Field of Classification Search
 USPC .......................................................... 429/99
 See application file for complete search history.

(56) References Cited

U.S. PATENT DOCUMENTS

| 2005/0031945 A1* | 2/2005 | Morita et al. ................. 429/158 |
| 2010/0216011 A1* | 8/2010 | Yoo et al. ...................... 429/160 |
| 2010/0263201 A1* | 10/2010 | Hisamitsu et al. ........... 29/623.2 |

\* cited by examiner

*Primary Examiner* — Karie O'Neill Apicella
(74) *Attorney, Agent, or Firm* — Jackson IPG PLLC (57) ABSTRACT

A chargeable battery module installed in an electric car for driving the electric car includes a compartment for containing a plurality of chargeable batteries, and circuits of each chargeable battery are connected in series or in parallel and installed between each chargeable battery and an upper casing or a lower casing of the compartment, and each chargeable battery is combined for use, and the chargeable batteries including a single chargeable battery or a module of parallelly connected chargeable batteries can be charged easily without requiring a charging protection plate, and all single batteries can be fully charged with a constant voltage to provide the best cycle life of the chargeable batteries and maintain the best battery life for the electric car.

6 Claims, 9 Drawing Sheets

CHARGEABLE BATTERY MODULE OF ELECTRIC CAR

BACKGROUND OF THE INVENTION

1. Field of the Invention

The present invention relates to a chargeable battery module of an electric car, and more particularly to a chargeable battery module of an electric car, and the chargeable battery module has the advantages of an easy and convenient installation, a low cost, a long life, a good performance, as well as a high capability to maintain the battery life of the electric car.

2. Description of the Related Art

In the mid to late 20$^{th}$ Century, people heavily relying on fossil fuels as an energy source encountered a serious oil crisis, and thus energy saving and environmental protection become the most popular issues of the world after our living environment has been damaged and polluted tremendously.

Statistical data prepared by the International Energy Agency show that the petroleum consumption on transportations in the years of 2001-2003 occupies approximately 57% of the world's consumption, and the consumption is expected to exceed 60% in 2010.

With the issues and trends of oil shortage and environmental pollution, people propose a technological revolution for the transportation means that require most energy consumption and start seeking new energy sources and systems that can be used extensively and conveniently in different transportation means at a low cost and causing less or no pollution to the environment. Almost every country recognizes that we have to change our way of using energy sources for transportations in the future. As we pay increasingly more attentions to the issues of energy saving and environmental protection, new transportation products such as electric cars are constantly introduced into the market, and battery has become a bottleneck of the development of the electric transportation products, and key factors affecting the maturity of the electric transportation products are the battery itself, the capacity, and the charge and discharge speeds of the battery. As to the battery capacity, combining several batteries into a battery module is an ideal solution for the time being. Although a combination of several batteries can increase the battery capacity, the present combination of batteries adopts the method of soldering nickel plates, thus it cannot replace some aged or damaged batteries easily, in order to reduce the cost of purchasing new batteries. In addition, the method of combining batteries into a module involves complicated structures and manufacturing processes, not only incurring a higher cost and a lower yield rate, but also creating a technical obstacle to the development of the startup electric vehicle industry.

SUMMARY OF THE INVENTION

Therefore, it is a primary objective of the present invention to provide a chargeable battery module with flexible applications and a convenient installation, and capable of lowering the cost of the chargeable battery, extending the life of the chargeable battery, and providing the best performance of the chargeable battery to maintain an excellent battery life of an electric car.

The chargeable battery module of the present invention is installed in an electric car and provided for transmitting an electric power to a driving unit to rotate wheels and drive the electric car to move forward. The chargeable battery module comprises a compartment for installing and containing a plurality of chargeable batteries, and circuits required for connecting each chargeable battery in series or in parallel are installed between each chargeable battery and an upper casing or a lower casing of the compartment and each chargeable battery is combined when the battery module is used. The present invention provides an easy way of controlling the charging of the chargeable battery including a chargeable battery or a module of parallelly connected chargeable batteries. When use, the single chargeable batteries are connected in series or in parallel, such that a charging protection plate is no longer required, and all single batteries can be fully charged with a constant voltage, so as to provide the best cycle life of the chargeable battery and maintain a good battery life of the electric car.

DETAILED DESCRIPTION OF THE PREFERRED EMBODIMENTS

The technical characteristics, effects and advantages of the present invention will be apparent with the detailed description of preferred embodiment together with the illustration of related drawings as follows.

Figure 1:
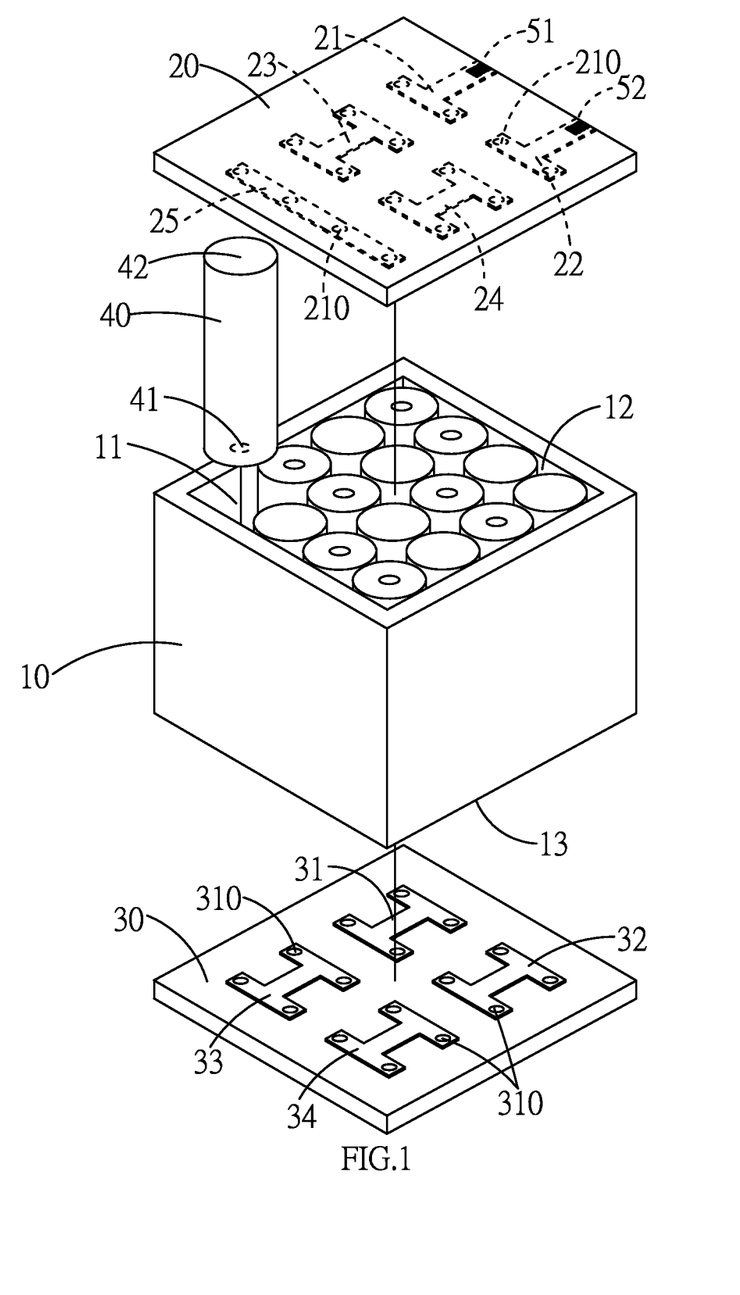
FIG. 1 is an exploded view of a chargeable battery module in accordance with a first preferred embodiment of the present invention.
Figure 2:
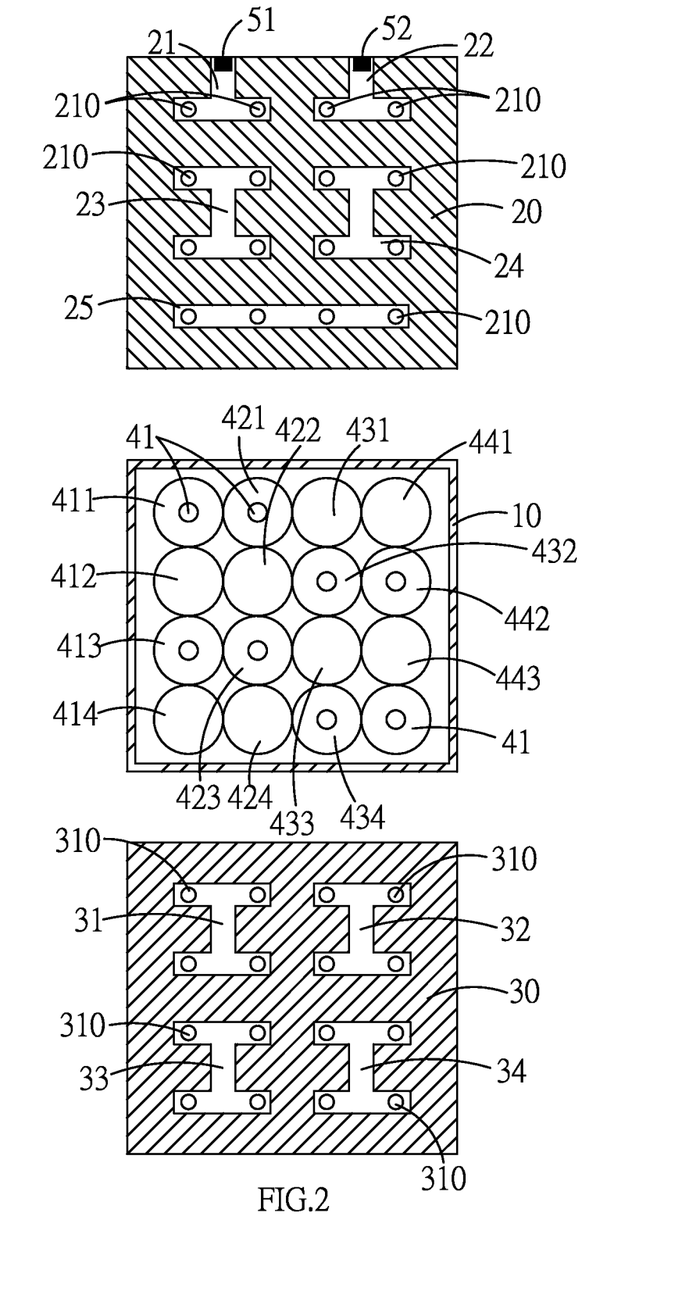
FIG. 2 is a schematic view of a chargeable battery module in accordance with a first preferred embodiment of the present invention.

With reference to FIGS. 1 and 2 for an improved chargeable battery module of an electric car in accordance with a first preferred embodiment of the present invention, the chargeable battery module 1 comprises a compartment 10, upper and lower casings 20, 30 and a plurality of chargeable batteries 40.

The compartment 10 includes a containing space 11, and the containing space 11 includes upper and lower openings 12, 13.

The upper casing 20 is installed at the upper opening 12 of the containing space 11, and a plurality of connecting plates is installed between the upper casing 20 and the containing space 11, wherein there are five connecting plates (including the first, second, third, fourth and fifth connecting plates 21, 22, 23, 24, 25) as shown in FIGS. 1 and 2, and each connecting plate 21, 22, 23, 24, 25 includes at least two contact points 210;

The lower casing 30 is installed at a position corresponding to the lower opening 13 of the containing space 11, and a plurality of connecting plates is installed between the lower casing 30 and the containing space 11 in accordance with a preferred embodiment as shown in the figures, wherein four connecting plates (the first, second, third and fourth connecting plates 31, 32, 33, 34) are installed, and each connecting plate 31, 32, 33, 34 includes at least two contact points 310, and each connecting plate of the upper and lower casings 20, 30 is a nickel plate or a spring, and each contact point 210, 310 is a connector, a metal clip, a spring pin or a spring plate.

The plurality of chargeable batteries 40 is installed in the containing space 11, and anode and cathode 41, 42 of each chargeable battery 40 are coupled to the connecting plate, and the chargeable batteries 40 are connected in series or in parallel.

Sixteen chargeable batteries 40 are installed and contained in the containing space 11 of the compartment, and each chargeable battery 40 is a cylindrical battery and arranged in a 4×4 array, and each chargeable battery in adjacent first and second rows or adjacent third and fourth rows is arranged in the same direction along the horizontal direction and in opposite directions along the vertical direction, and each chargeable battery in adjacent second and third rows is arranged in opposite directions along the horizontal direction. In other words, anodes of the first chargeable batteries 411, 421 in the first and second rows are facing upward, and cathodes of the second chargeable batteries 412, 422 in the first and second rows are facing upward, and cathodes of the first chargeable batteries 431, 441 in the third and fourth rows are facing upward.

Figure 3:
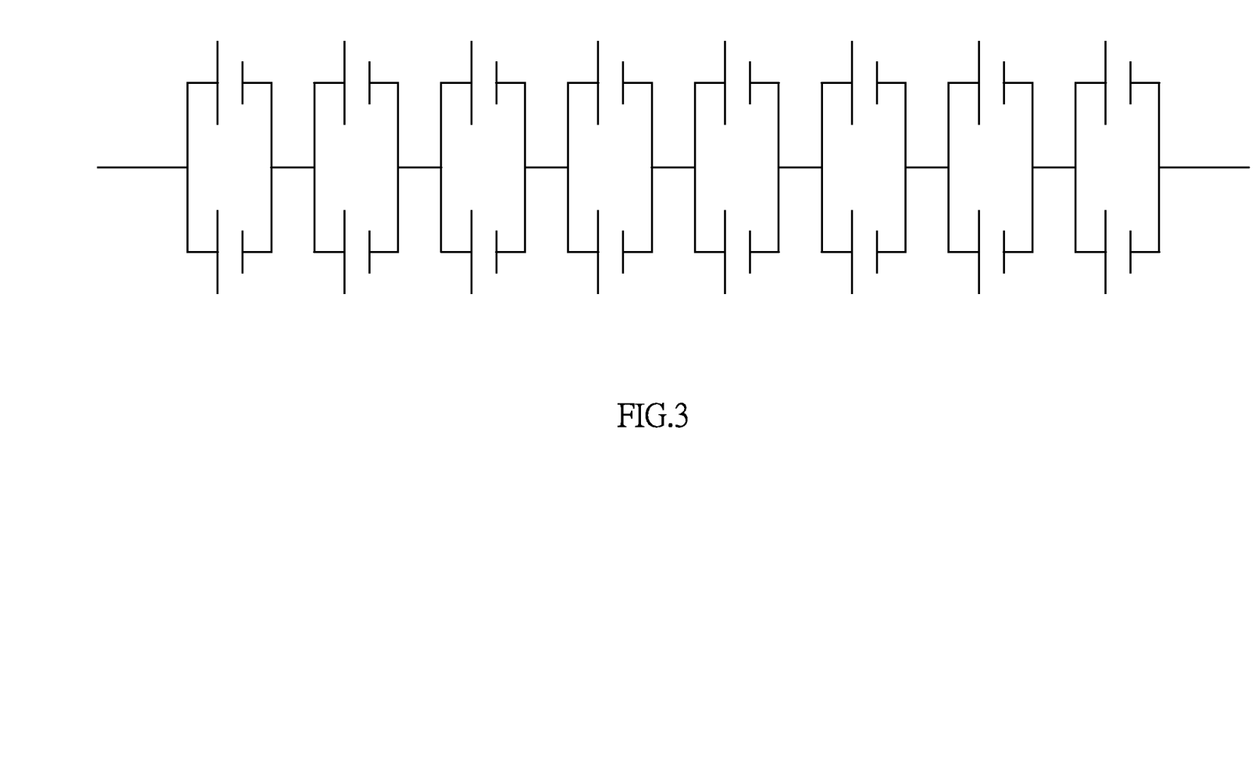
FIG. 3 is a schematic view of a circuit of a chargeable battery module in accordance with the present invention.

The contact points 210 of the first connecting plate 21 of the upper casing are contacted with the first chargeable batteries 411, 421 in the first and second rows, and the contact points 210 of the second connecting plate 22 are contacted with the first chargeable batteries 431, 441 in the third and fourth rows, and the contact points 210 of the third connecting plate 23 are contacted with the second and third chargeable batteries 412, 422, 413, 423 in the first and second rows, and the contact points 210 of the fourth connecting plate 24 are contacted with the second and third chargeable batteries 432, 442, 433, 443 in the third and fourth rows, and the contact points 210 of the fifth connecting plate 25 are contacted with the fourth chargeable batteries 414, 424, 434, 444t in the first, second, third and fourth rows; and the contact points 310 of the first connecting plate 31 of the lower casing are contacted with the first and second chargeable batteries 411, 421, 412, 422 in the first and second rows, and the contact points 310 of the second connecting plate 32 are contacted with the first and second chargeable batteries 431, 441, 432, 442 in the third and fourth rows, and the contact points 310 of the third connecting plate 33 are contacted with the third and fourth chargeable batteries 413, 423, 414, 424 in the first and second rows, and the contact points 310 of the fourth connecting plate 34 are contacted with the third and fourth chargeable batteries 433, 443, 434, 444 in the third and fourth rows, and the connecting plates of the first preferred embodiment are installed in a way of arranging each chargeable battery 40 in the compartment 10 into a circuit with eight serial connections and two parallel connections as shown in FIG. 3. Of course, the invention can further comprise first and second external contact points 51, 52 as shown in FIGS. 1 and 2, and the first and second external contact points 51, 52 are formed on the upper casing 20 and coupled to the first and second connecting plates 21, 22 respectively.

Figure 4:
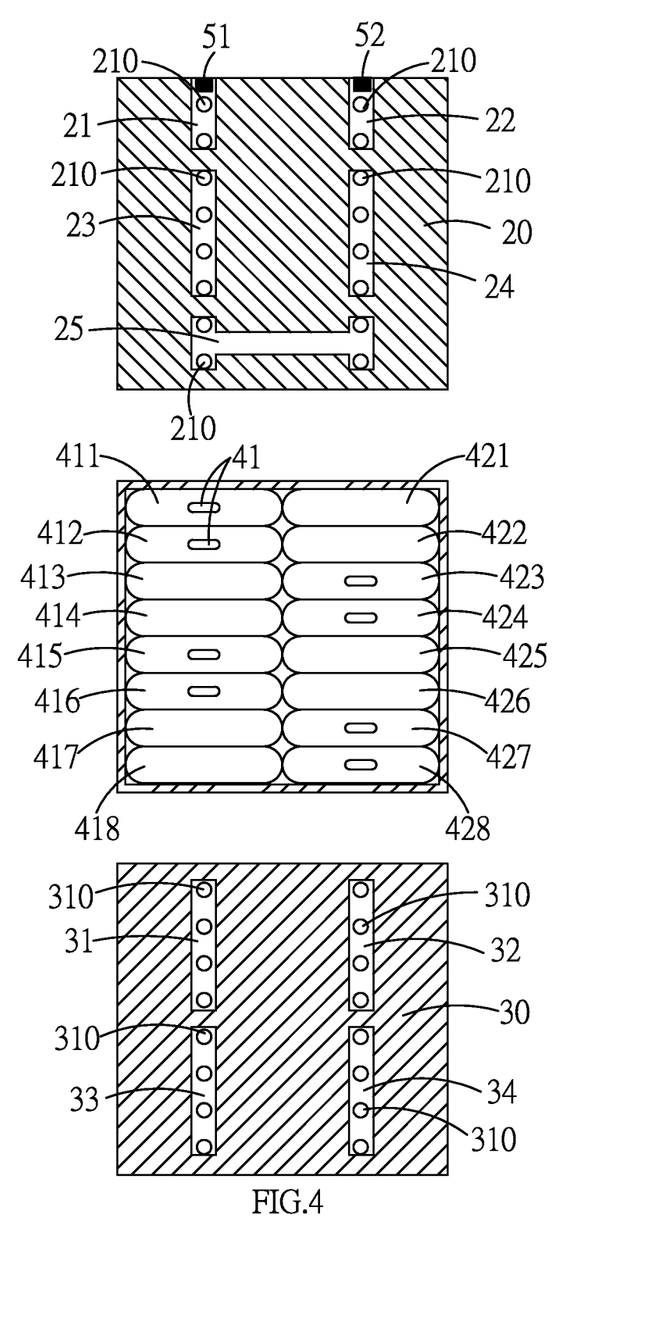
FIG. 4 is an exploded view of a chargeable battery module in accordance with a second preferred embodiment of the present invention.

In a second preferred embodiment as shown in FIG. 4, each chargeable battery 40 is a square battery, and arranged in a 2×8 array, and each chargeable battery in adjacent first and second rows are grouped two by two and arranged in a same direction along the vertical direction, and adjacent groups are arranged in opposite directions. In other words, anodes of the first and second chargeable batteries 411, 412 in the first row are facing upward, and cathodes of the first and second chargeable batteries 421, 422 in the second row are facing upward, and cathodes of the third and fourth chargeable batteries 413, 414 in the first row are facing upward.

The contact points 210 of the first connecting plate 21 of the upper casing are contacted with the first and second chargeable batteries 411, 412 in the first row, and the contact points 210 of the second connecting plate 22 are contacted with the first and second chargeable batteries 421, 422 in the second row, and the contact points 210 of the third connecting plate 23 are contacted with the third to sixth chargeable batteries 413, 414, 415, 416 in the first row, and the contact points 210 of the fourth connecting plate 24 are contacted with the third to sixth chargeable batteries 423, 424, 425, 426 in the second row, and the contact points 210 of the fifth connecting plate 25 are contacted with the seventh and eighth chargeable batteries 417, 427, 418, 428 in the first and second rows; and the contact points 310 of the first connecting plate 31 of the lower casing are contacted with the first to fourth chargeable batteries 411, 412, 413, 414 in the first row, and the contact points 310 of the second connecting plate 32 are contacted with the first to fourth chargeable batteries 421, 422, 423, 424 in the second row, and the contact points 310 of the third connecting plate 33 are contacted with the fifth to eighth chargeable batteries 415, 416, 417, 418 in the first row, and the contact points 310 of the fourth connecting plate 34 are contacted with the fifth to eighth chargeable batteries 425, 426, 427, 428 in the second row, and the connecting plates of the second preferred embodiment are installed in the compartment 10 in a way of forming each chargeable battery 40 in a circuit with eight serial connections and two parallel connection as shown in FIG. 4. Of course, the invention can further comprise first and second external contact points 51, 52 as shown in FIG. 5, and the first and second external contact points 51, 52 are formed on the upper casing 20 and coupled to the first and second connecting plates 21, 22 respectively.

Figure 5:
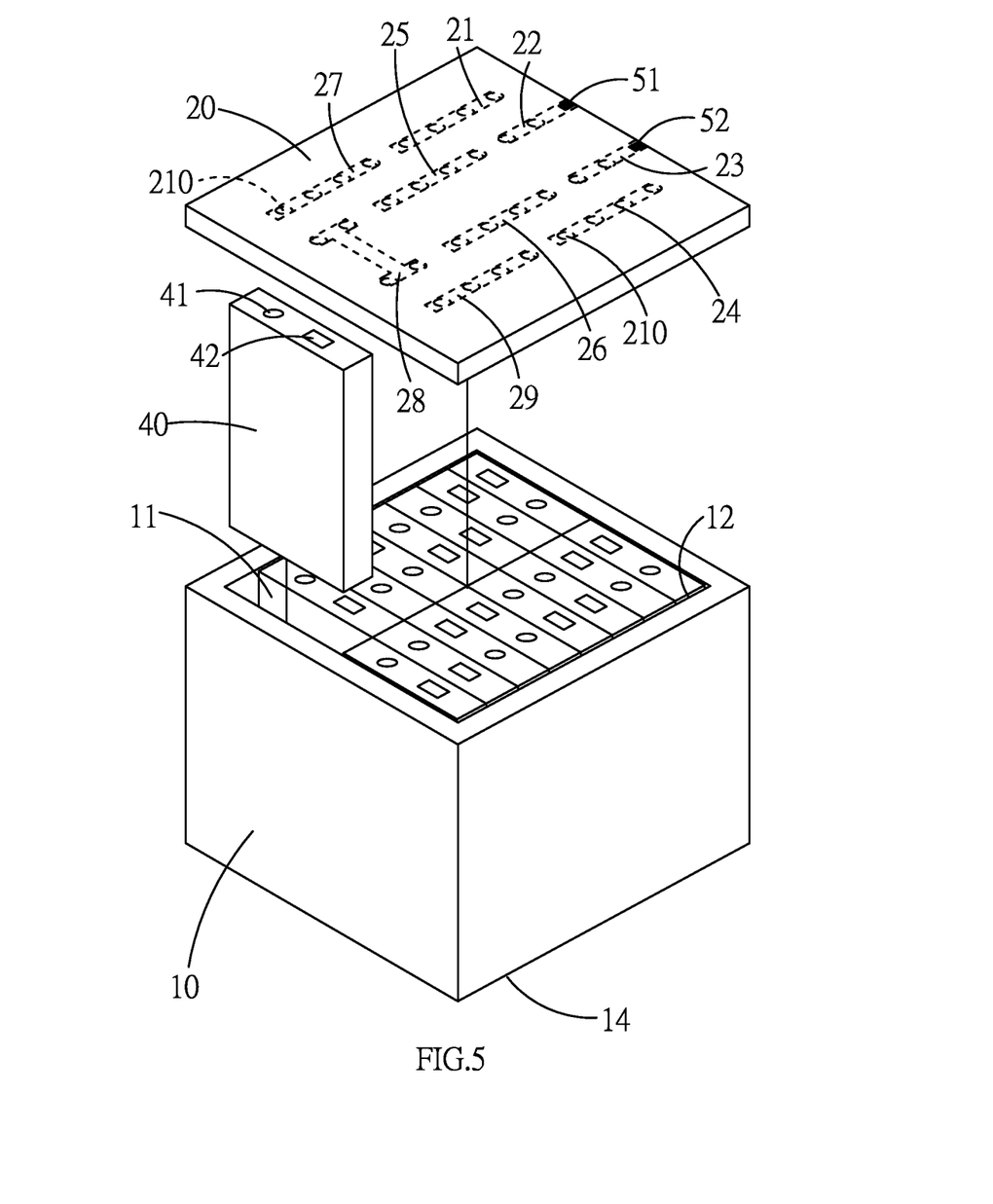
FIG. 5 is an exploded view of a chargeable battery module in accordance with a third preferred embodiment of the present invention.
Figure 6:
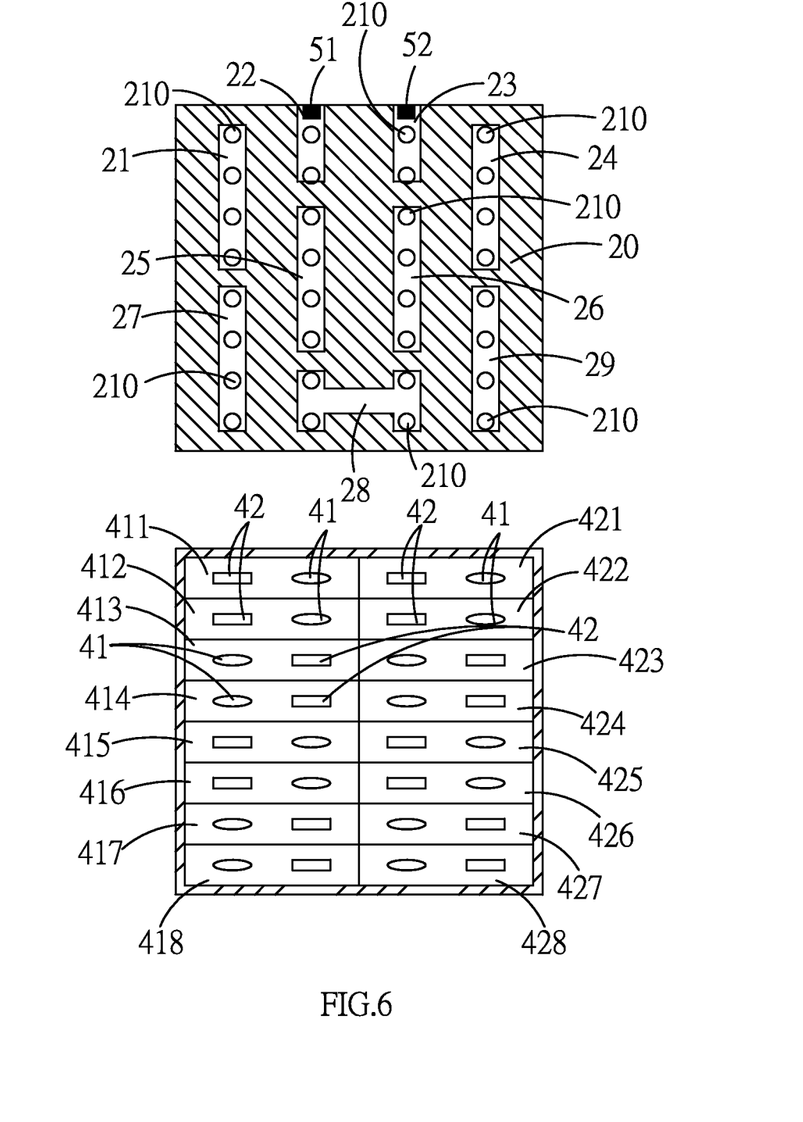
FIG. 6 is a schematic view of a structure of a chargeable battery module in accordance with a third preferred embodiment of the present invention.

In a third preferred embodiment as shown in FIGS. 5 and 6, the chargeable battery module comprises a compartment 10, an upper casing 20 and a plurality of chargeable batteries 40, wherein the compartment 10 also includes a containing space 11, and the containing space includes an upper opening 12 and a bottom surface 14, and each chargeable battery 40 is installed and contained in the containing space 11, and the upper casing 20 is installed at a position corresponding to the upper opening 12 of the containing space, and a plurality of connecting plates is installed between the upper casing 20 and the containing space. In a preferred embodiment as shown in FIGS. 5 and 6, nine connecting plates (the first, second, third, fourth, fifth, sixth, seventh, eighth and ninth connecting plates 21, 22, 23, 24, 25, 26, 27, 28, 29) are installed, and each connecting plate 21, 22, 23, 24, 25, 26, 27, 28, 29 includes at least two contact points 210.

The containing space 11 of the compartment contains sixteen chargeable batteries 40, and each chargeable battery 40 is a lithium-ion polymer battery, and an anode and a cathode 41, 42 of each secondary battery 40 are installed at both ends on the same side respectively, and each chargeable battery is arranged in a 2×8 array, wherein the chargeable batteries are grouped two by two and arranged in the same direction along the vertical direction, and adjacent groups are arranged in opposite directions. In other words, the cathodes 42 of the first and second chargeable batteries 411, 412 in the first row are situated on the left side and the anodes 41 are situated on the right side, and the cathodes 42 of the first and second chargeable batteries 421, 422 in the second row are facing upward, and the cathodes 42 of the third and fourth chargeable batteries 413, 414 in the first row are facing upward.

The contact points 210 of the first connecting plate 21 of the upper casing are contacted with the cathodes 42 of the first and second chargeable batteries 411, 412 and the anodes 41 of the third and fourth chargeable batteries 413, 414 in the first row, and the contact points 210 of the second connecting plate 22 are contacted with the anodes 41 of the first and second chargeable batteries 421, 422 in the first row, and the contact points 210 of the third connecting plate 23 are contacted with the cathodes 42 of the first and second chargeable batteries 421, 422 in the second row, and the contact points 210 of the fourth connecting plate 24 are contacted with the anodes 41 of the first and second chargeable batteries 421, 422 and the cathodes 42 of the third and fourth chargeable batteries 423, 424 in the second row, and the contact points 210 of the fifth connecting plate 25 are contacted with the cathodes 42 of the third and fourth chargeable batteries 413, 414 and the anodes 41 of the fifth and sixth chargeable batteries 415, 416 in the first row, and the contact points 210 of the sixth connecting plate 26 are contacted with the anodes 41 of the third and fourth chargeable batteries 423, 424 and the cathodes 42 of the fifth and sixth chargeable batteries 425, 426 in the second row, and the contact points 210 of the seventh connecting plate 27 are contacted with the cathodes 42 of the fifth and sixth chargeable batteries 415, 416 and the anodes 41 of the seventh and eighth chargeable batteries 417, 417 in the first row, and the contact points 210 of the eighth connecting plate 28 are contacted with the cathodes 42 of the seventh and eighth chargeable batteries 417, 418 in the first row and the anodes 41 of the seventh and eighth chargeable batteries 427, 428 in the second row, and the contact points 210 of the ninth connecting plate 29 are contacted with the anodes 41 of the fifth and sixth chargeable batteries 425, 426 and the cathodes 42 of the seventh and eighth chargeable batteries 427, 428 in the second row. The connecting plates of the third preferred embodiment are installed in a way of forming each chargeable battery in the compartment into a circuit with eight serial connections and two parallel connections. Of course, the invention can further comprise first and second external contact points 51, 52 as shown in FIG. 5, and the first and second external contact points 51, 52 are formed on the upper casing 20 and coupled to the first and second connecting plates 21, 22 respectively.

Figure 7:
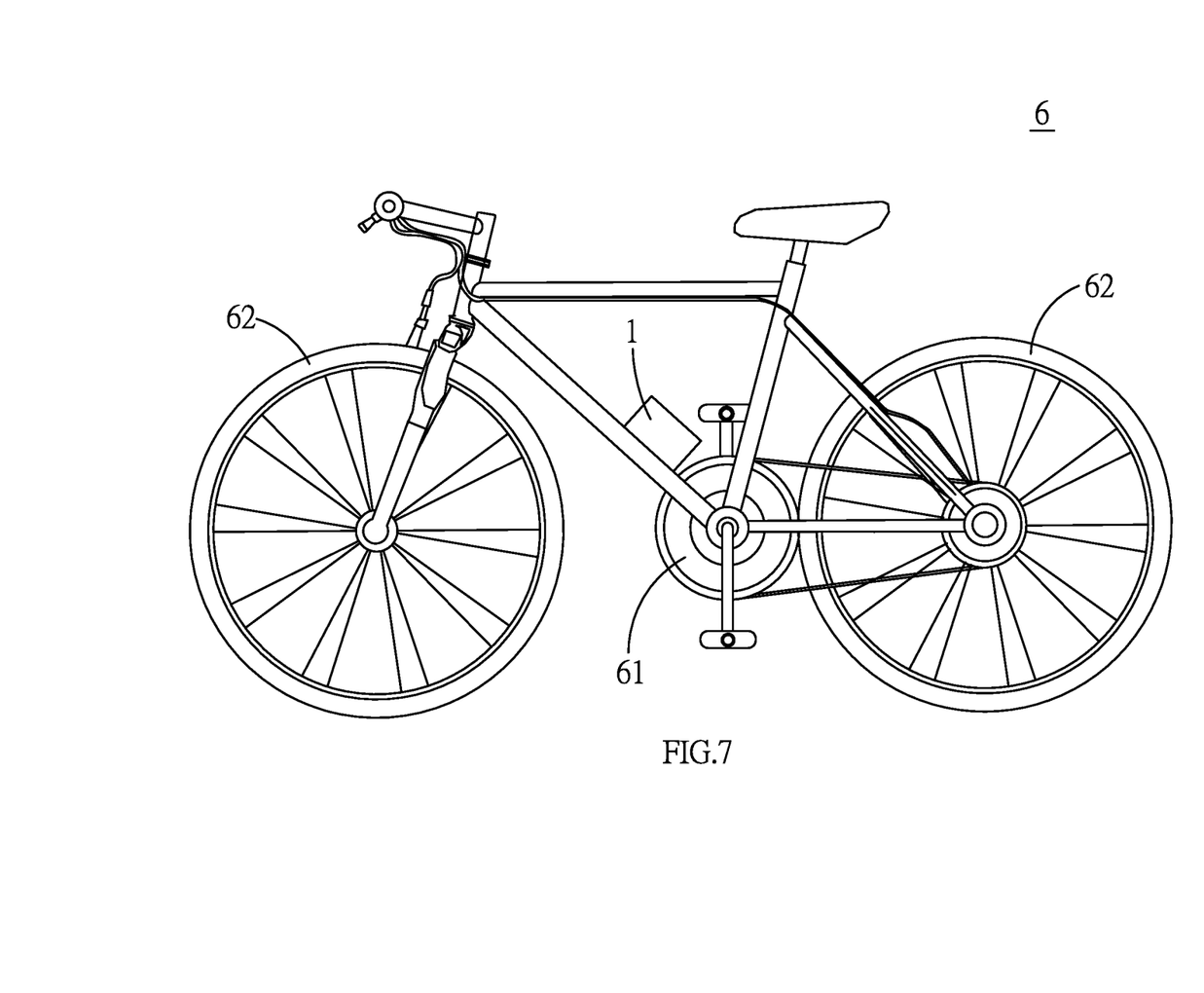
FIG. 7 is a schematic view of a chargeable battery module applied in an electric bicycle in accordance with the present invention.
Figure 8:
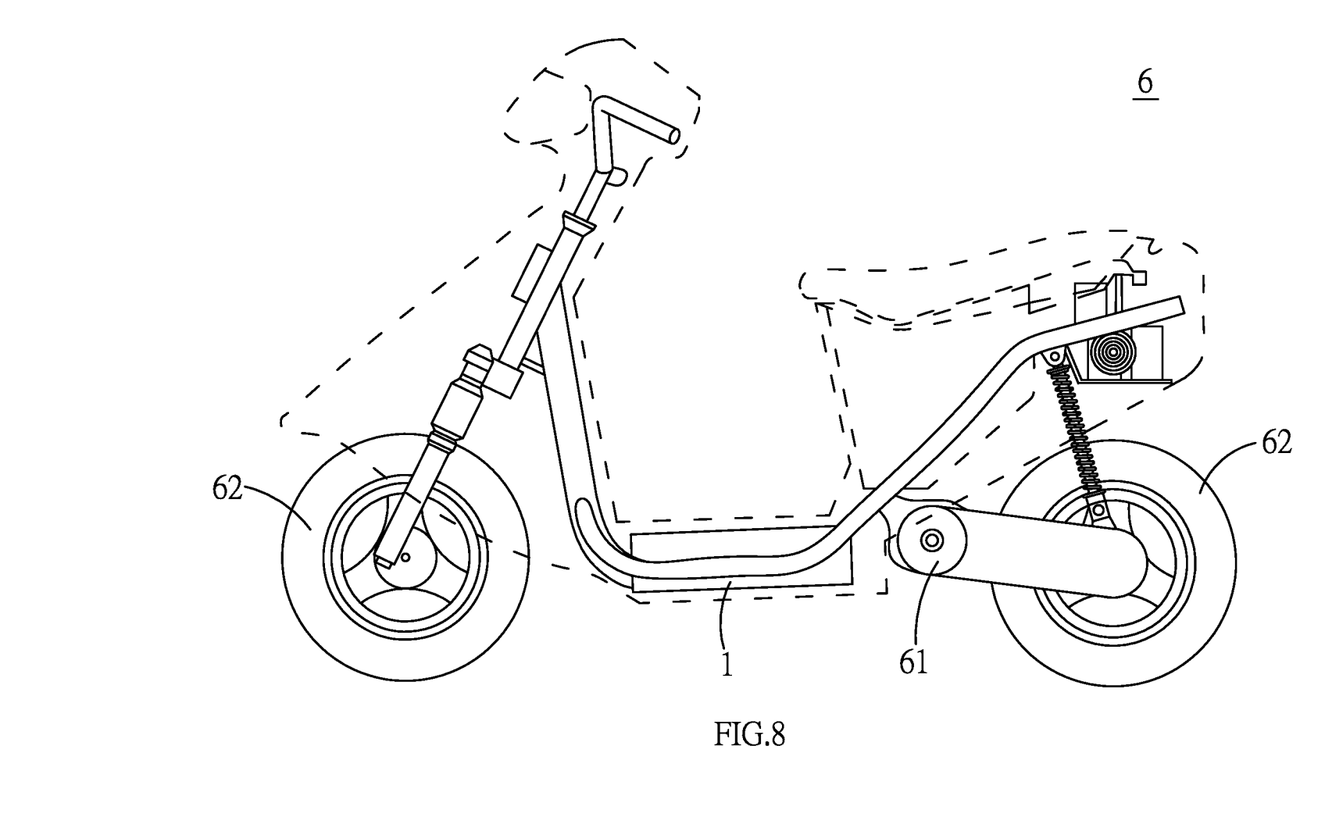
FIG. 8 is a schematic view of a chargeable battery module applied in an electric motorcycle in accordance with the present invention.
Figure 9:
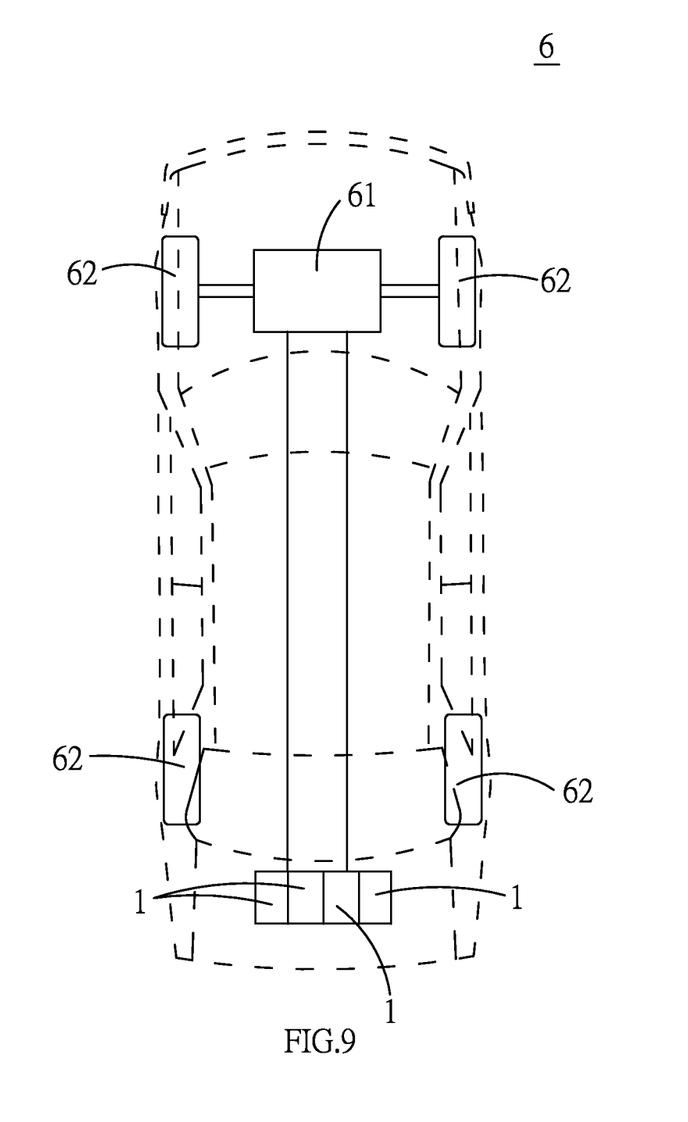
FIG. 9 is a schematic view of a chargeable battery module applied in an electric car in accordance with the present invention.

The chargeable battery modules in accordance with the foregoing preferred embodiments can be applied to an electric vehicle, such as an electric bicycle (as shown in FIG. 7), an electric motorcycle (as shown in FIG. 8) or an electric car (as shown in FIG. 9), wherein the electric car 6 comprises the chargeable battery module 1 of the present invention, a driving unit 61 and at least two wheels 62, and the first and second external contact points of the chargeable battery module 1 are coupled to a driving unit (not show in the figure), and the chargeable battery module 1 transmits an electric power to the driving unit 61 (which is a motor) to rotate wheels 62 to drive the electric car to move forward. Of course, a plurality of chargeable battery modules of the present invention can be connected in series or in parallel to increase the output of the electric power.

In the foregoing preferred embodiments, each connecting plate can be integrally and respectively formed at the upper and lower casings or separately at the upper and lower casings.

Compared with the conventional chargeable battery module, the present invention has the following advantages:

1. The circuit for connecting each chargeable battery of the present invention is manufactured on the upper casing or the lower casing of the compartment separately without requiring a soldering process to simplify the manufacturing process and lower the manufacturing cost.

2. When the chargeable battery module is charged, a charging device can be used for charging the chargeable batteries one by one, or the chargeable batteries connected in parallel are changed, such that after each chargeable battery is charged, the chargeable batteries have the same voltage and electric capacity, and the chargeable battery can provide a better performance and have a longer using life. Since the charging circuit board can be installed in the charging device, therefore the chargeable battery module does not require an additional charging circuit board.

3. Since the circuits and the chargeable batteries of the present invention are detachable and not soldered, therefore if any one of the chargeable batteries is damaged, the damaged chargeable battery can be replaced convenient, without the need of replacing the whole battery module In summation of the above description, the present invention herein enhances the performance than the conventional structure and further complies with the patent application requirements and is duly filed for patent application. While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A chargeable battery module of an electric car, and the electric car having the chargeable battery module, a driving unit and at least two wheels, and the chargeable battery module transmitting an electric power to the driving unit to drive and rotate the wheels, characterized in that the chargeable battery module comprises a compartment for containing a plurality of chargeable batteries and an upper casing, and the compartment includes a containing space, and the containing space includes an upper opening and a bottom, and the upper casing is installed at the upper opening of the containing space, and a plurality of connecting plates is installed between the upper casing and the containing space, and wherein each of the connecting plate is integrally formed at the upper casings, so that respective anodes and cathodes of the respective chargeable batteries are coupled to the connecting plates in a non-solder welded manner, and the chargeable batteries are connected in series or in parallel;

wherein the containing space of the compartment contains sixteen chargeable batteries, and the anode and cathode of each of the chargeable batteries are disposed at both ends of a same surface respectively, and the chargeable batteries are arranged in a 2×8 array, and the chargeable batteries in the vertical direction are grouped two by two and arranged in the same direction, and two adjacent groups of chargeable batteries are arranged in opposite directions; and wherein nine connecting plates are installed between the upper casing and the containing space, and the first connecting plate is contacted with cathodes of the first and second chargeable batteries and anodes of the third and fourth chargeable batteries in the first row, and the second connecting plate is contacted with anodes of the first and second chargeable batteries in the first row and the third connecting plate is contacted with cathodes of the first and second chargeable batteries in second row, and the fourth connecting plate is contacted with anodes of the first and second chargeable batteries and cathodes of the third and fourth chargeable batteries in the second row, and the fifth connecting plate is contacted with cathodes of the third and fourth chargeable batteries and anodes of the fifth and sixth chargeable batteries in the first row, and the sixth connecting plate is contacted with anodes of the third and fourth chargeable batteries and cathodes of the fifth and sixth chargeable batteries in of the second row, and the seventh connecting plate is contacted with the fifth and sixth chargeable batteries and anodes of the seventh and eighth chargeable batteries in first row, and the eighth connecting plate is contacted with cathodes of seventh and eighth chargeable batteries and anodes of the second row of seventh and eighth chargeable batteries in the first row, and the ninth connecting plate is contacted with anodes of the fifth and sixth chargeable batteries and cathodes of the seventh and eighth chargeable batteries in the second row.

2. The chargeable battery module of an electric car as recited in claim 1, wherein the connecting plate is a nickel plate or a spring.

3. The chargeable battery module of an electric car as recited in claim 1, wherein the driving unit is a motor.

4. The chargeable battery module of an electric car as recited in claim 1,
wherein each connecting plate further includes contact points, and each contact point is a connector, a metal clip, a spring pin or a spring plate.

5. The chargeable battery module of an electric car as recited in claim 1,
wherein each of the chargeable batteries is a lithium-ion polymer battery.

6. The chargeable battery module of an electric car as recited in claim 1, further comprising first and second external contact points, formed on the upper casing, coupled to the second and third connecting plates respectively, and coupled to the driving unit.

* * * * *